(12) United States Patent
Gothoskar et al.

(10) Patent No.: US 7,109,739 B2
(45) Date of Patent: Sep. 19, 2006

(54) WAFER-LEVEL OPTO-ELECTRONIC TESTING APPARATUS AND METHOD

(75) Inventors: Prakash Gothoskar, Allentown, PA (US); Margaret Ghiron, Allentown, PA (US); Robert Keith Montgomery, Easton, PA (US); Vipulkumar Patel, Breinigsville, PA (US); Kalpendu Shastri, Orefield, PA (US); Soham Pathak, Allentown, PA (US); David Piede, Allentown, PA (US); Katherine A. Yanushefski, Zionsville, PA (US)

(73) Assignee: SiOptical, Inc., Allentown, PA (US)

( * ) Notice: Subject to any disclaimer, the term of this patent is extended or adjusted under 35 U.S.C. 154(b) by 0 days.

(21) Appl. No.: 11/075,430

(22) Filed: Mar. 8, 2005

(65) Prior Publication Data

US 2005/0194990 A1  Sep. 8, 2005

Related U.S. Application Data

(60) Provisional application No. 60/551,316, filed on Mar. 8, 2004.

(51) Int. Cl.
*G01R 31/26* (2006.01)
*G01R 31/00* (2006.01)

(52) U.S. Cl. ......................... 324/765; 324/96

(58) Field of Classification Search ............ None
See application file for complete search history.

(56) References Cited

U.S. PATENT DOCUMENTS 3,777,154 A * 12/1973 Lindsey ............... 250/227.11
5,841,544 A   11/1998 Dautartas et al.
6,337,871 B1   1/2002 Choa
6,577,148 B1 *  6/2003 DeHaven et al. .......... 324/765
6,686,993 B1   2/2004 Karpman et al.
6,731,122 B1   5/2004 Feng
6,788,847 B1   9/2004 Paddon et al.
6,836,135 B1 * 12/2004 Harris et al. ............... 324/765
6,859,587 B1   2/2005 Nikonov et al.
2003/0123793 A1   7/2003 Johannessen
2004/0013378 A1   1/2004 Lee et al.

FOREIGN PATENT DOCUMENTS

GB         2332775 A  *  6/1999

* cited by examiner

Primary Examiner—Vinh Nguyen
Assistant Examiner—Russell M. Kobert
(74) Attorney, Agent, or Firm—Wendy W. Koba

(57) ABSTRACT

A wafer-level testing arrangement for opto-electronic devices formed in a silicon-on-insulator (SOI) wafer structure utilizes a single opto-electronic testing element to perform both optical and electrical testing. Beam steering optics may be formed on the testing element and used to facilitate the coupling between optical probe signals and optical coupling elements (e.g., prism couplers, gratings) formed on the top surface of the SOI structure. The optical test signals are thereafter directed into optical waveguides formed in the top layer of the SOI structure. The opto-electronic testing element also comprises a plurality of electrical test pins that are positioned to contact a plurality of bondpad test sites on the opto-electronic device and perform electrical testing operations. The optical test signal results may be converted into electrical representations within the SOI structure and thus returned to the testing element as electrical signals.

17 Claims, 3 Drawing Sheets

WAFER-LEVEL OPTO-ELECTRONIC TESTING APPARATUS AND METHOD

CROSS-REFERENCE TO RELATED APPLICATION

This application claims the benefit of U.S. Provisional Application No. 60/551,316, filed Mar. 8, 2004.

TECHNICAL FIELD

The present invention relates to the provisioning of wafer-level testing and, more particularly, to the capability of providing optical, electrical and opto-electronic testing of various elements formed on a silicon-on-insulator (SOI) structure using a single testing element.

BACKGROUND OF THE INVENTION

In the semiconductor industry, a relatively large silicon wafer (generally on the order of several inches in diameter) is processed to form a multiple number of identical integrated circuits. Once the wafer has been completely processed, it is "diced" apart to form the individual integrated circuits. In most cases, hundreds of identical circuits are formed across the wafer surface. If the performance of the individual circuits is not tested prior to dicing, a "bad" chip may be further processed and packaged, wasting valuable time and money.

Wafer-level testing is well-known in the semiconductor industry and is traditionally used to measure various electrical parameters on each integrated circuit while still in wafer form to verify conformance of the integrated circuit with pre-defined specifications. Beyond the ability to verify conformance to the specifications, wafer-level testing in the integrated circuit industry has the inherent capabilities to identify process problems, provide pass/fail criteria, perform data collection and generate/run specialized tests on the wafer (e.g., customer-specific tests).

The increased use of integrated electronics and optics on a single SOI structure now requires the development of wafer-level testing for both the electronics and optics. This type of wafer-level testing requires electrical inputs/outputs in the form of test pad/points, as well as optical inputs/outputs in the form of couplers, fibers, etc. Commonly-used methods for coupling light into SOI waveguides (such as, for example, inverse nanotapers and three-dimensional tapers) require access to the edge of the chip (or die) to couple into the waveguide structure. U.S. Pat. No. 6,859,587 issued to D. E. Nikonov et al. illustrates one exemplary "edge" coupling method for testing lightwave circuits at the wafer level. In this case, a first optical fiber is coupled to a first "edge" of the lightwave circuit and used to bring a probe/test optical signal into the lightwave circuit. A second optical fiber is coupled to an opposing "edge" of the circuit, and used to collect the output/test optical signal. The need to have access to the "edges" of the circuit is considered to be a severe limitation of this particular wafer-level optical testing method.

U.S. Patent Application Publication 2003/123793 ("Johannessen"), published on Jul. 3, 2003, illustrates an alternative "optical probe" arrangement where testing of a planar lightwave circuit is achieved by removing a top surface portion of the circuit material in selected locations to gain access to a waveguide structure, allowing an optical probe to be brought into direct contact with the waveguide. While this arrangement eliminates the need to perform "edge" contacts, this type arrangement is considered as "destructive testing", since a portion of the circuit must be removed to perform the testing. Obviously, when performing repeated tests at multiple circuit locations on a wafer, destructive testing is not a preferred choice. Further, it is not clear that this type of optical probe could be used with sub-micron dimensioned optical waveguides, which are finding increased use for single mode communication applications. Moreover, both of these prior art arrangements require the use of index matching fluids between the optical probe and the wafer (raising issues regarding reproducibility of measurements and contamination) and provide only optical testing; a traditional electronic "probe card" is still required to analyze and test the electronics on the wafer.

Thus, a need remains in the prior art for a wafer-level testing methodology that combines optical and electrical testing into a single arrangement.

SUMMARY OF THE INVENTION

The need remaining in the prior art is addressed by the present invention, which relates to the provisioning of wafer-level testing and, more particularly, to the capability of providing optical, electrical and opto-electronic testing of various elements formed on a silicon-on-insulator (SOI) structure using a single testing element, advantageously leveraging the body of knowledge associated with traditional wafer-level testing of electronic components.

In accordance with the present invention, an opto-electronic testing element is configured to include the components required for both optical and electrical testing. As disclosed in various ones of our co-pending applications (see, for example U.S. Published Application No. 2004/0213518, published Nov. 8, 2004 or U.S. application Ser. No. 10/935,146, filed Sep. 7, 2004), direct optical coupling into a sub-micron dimensioned optical waveguide (SOI layer) portion of an opto-electronic chip is accomplished by using optical prisms or grating structures, disposed on the surface of the SOI structure, to directly couple light into the SOI layer of the structure. Beam steering/shaping optics may be included in the inventive opto-electronic testing element and used to provide efficient coupling into and out of the prism/grating structure. A plurality of electronic test points (probes) are formed in conventional fashion on the testing element to perform the desired electrical testing of the SOI structure.

In a preferred embodiment, a feedback signal may be applied between the SOI structure and the beam steering portion of the opto-electronic testing element to adjust the location of the beam with respect to the coupling element on the SOI structure.

The input and output optical test signals may be coupled using an array of optical fibers, preferably polarization maintaining fibers. Exterior lenses (or integral lenses formed on the fiber endface) may be used to enhance optical coupling efficiency. Input wavelength tuning may be performed to match the mode angle of the waveguide being tested on the wafer surface and thus enhance coupling efficiency, utilizing one or more feedback signals from the wafer to control the tuning.

Other and further modifications and aspects of the present invention will become apparent during the course of the following discussion and by reference to the accompanying drawings.

BRIEF DESCRIPTION OF THE DRAWINGS

Referring now to the drawings.

DETAILED DESCRIPTION

As briefly alluded to above, one of the biggest challenges in the development of an optical testing element for SOI-based optical structures is the need to reliably couple an optical beam into a very thin waveguide being tested in a repeatable fashion. The angle at which the light is required to enter the thin waveguide is known to be a strong function of the waveguide thickness and the wavelength of the optical signal (that is, the mode angle of the light entering the SOI structure needs to be well-controlled so as to excite a specific mode in the waveguide). An aspect of the present invention is the ability to "tune" the wavelength of the test signal over a range such that acceptable coupling can be reliably achieved on a repeatable basis. Inasmuch as process variations will alter the thickness of the waveguiding layer from wafer to wafer, as well as the thickness of the associated evanescent coupling layer, the ability to monitor and "tune" the test wavelength in accordance with the present invention is considered to be a significant breakthrough in wafer-level testing of opto-electronic components.

Figure 1:
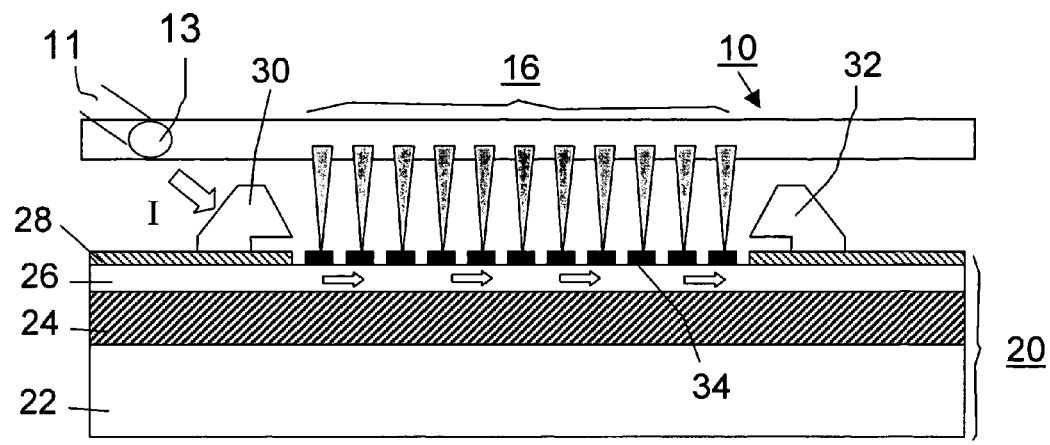
FIG. 1 illustrates, in a side view, an exemplary opto-electronic testing element of the present invention, in conjunction with an SOI structure to be tested, the embodiment of FIG. 1 utilizing optical prisms to provide coupling between the testing element and the SOI structure.

FIG. 1 is a side view of an exemplary arrangement for providing wafer-level opto-electronic testing, using an opto-electronic testing element 10 formed in accordance with the present invention. Testing element 10 is formed to support at least one input optical probe 11, in this case a fiber including a lensed endface 13. It is to be understood that an array of such lensed fibers may be used, as illustrated particularly below in FIG. 3, to provide a plurality of different optical test signals. Referring back to FIG. 1, input optical probe 11 is precisely aligned and fixed within testing element 10 such that probe 11 will direct an incoming beam I toward a wafer being tested, illustrated as an SOI structure 20. A plurality of electrical test probe points 16 is illustrated as also included on testing element 10, for electrically coupling to a plurality of electrical contacts (e.g., bondpads) 34 on SOI structure 20. It is to be understood that for "wafer" testing, each separate SOI structure is probed and tested on an individual basis, usually performed by a "step and repeat" method of moving the wafer with respect to the test probe.

Referring back to FIG. 1, SOI structure 20 is illustrated as including a silicon substrate 22, a silicon dioxide insulating layer 24 and a relatively thin (generally sub-micron thickness) upper silicon surface layer 26 (hereinafter referred to as "SOI layer 26"). In the particular embodiment of FIG. 1, a relatively thin evanescent coupling layer 28 (comprising a material with an index of refraction less than that of silicon, for example, silicon dioxide or silicon nitride) is disposed over selected portions of SOI layer 26 and used to assist in the coupling of the lightwave signal into and out of SOI layer 26. An input optical prism 30 and output optical prism 32 are disposed as shown in FIG. 1 over selected portions of evanescent coupling layer 28 and used to couple light between testing element 10 and SOI structure 20.

In a preferred embodiment of the present invention, the prism couplers comprise silicon structures (formed on a separate silicon substrate, for example) and then permanently attached to SOI structure 20 and used to provide optical coupling (as well as further testing) in the final device structure. It is an aspect of this embodiment of the present invention to make use of this permanent coupling structure to also be used as part of the optical probe for the opto-electronic testing element. Alternatively, one or more prism structures may be formed as an integral component on opto-electronic testing element 10.

Wafer-level testing is then performed, in accordance with the present invention, by bringing opto-electronic testing element 10 into contact with a selected area on the wafer (i.e., a "selected" SOI structure 20 as shown in FIG. 1). An optical test beam is launched into a waveguide within SOI structure 20 at a predetermined angle. By monitoring the optical power of the signal coupled into the SOI waveguide, the wavelength of the input test signal may be tuned (for example, to compensate for variations in waveguide thickness and/or testing element fabrication variations) to optimize the coupling of the optical test signal into the SOI waveguide. Once a satisfactory input test signal power is achieved, a series of optical and electrical tests are performed, with the results being fed back to analysis equipment. Using the conventional "step and repeat" mechanism, the wafer is moved with respect to testing element 10 such that each separate SOI structure is studied. If a certain SOI structure fails one or more tests (optical and/or electrical), that portion of the wafer may be marked as "bad" (for example, using a magnetic ink to mark the structures) and simply discarded when the wafer is diced into a plurality of separate dies. Additionally, a software map of the wafer, defining the test results of each individual die, can be created and maintained for future reference. As mentioned above, a significant advantage of the testing element of the present invention is that all wafer-level electrical, optical and opto-electronic test data is acquired by using the same testing element, thus greatly reducing the time and expense associated with the wafer-level testing process.

Figure 2:
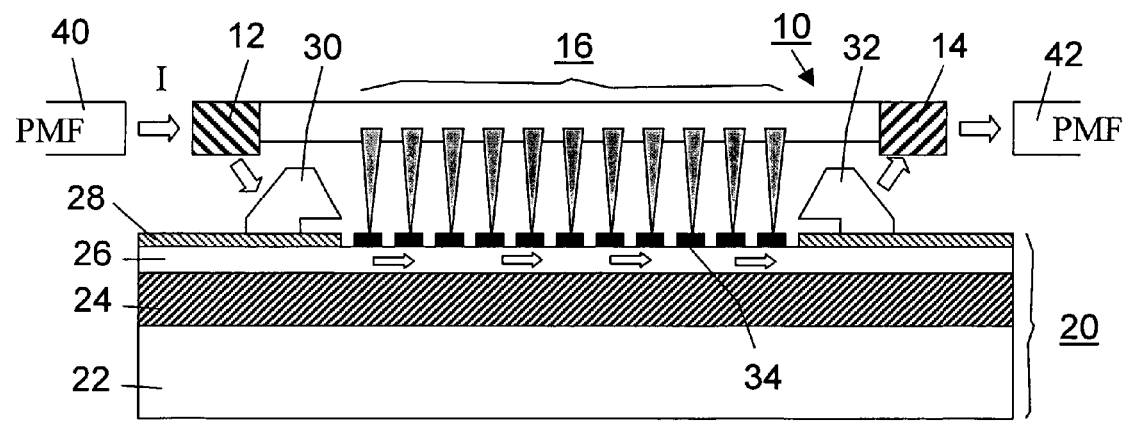
FIG. 2 illustrates an alternative opto-electronic testing element of the present invention, including beam steering/shaping optics within the testing element to facilitate the coupling of optical test signal(s) into the SOI structure.

FIG. 2 illustrates an alternative embodiment of an opto-electronic testing element 10, in this case incorporating beam steering/shaping optics into testing element 10 and coupling free space optical signals into and out of the testing element. The inclusion of beam steering/shaping optics allows for dynamic adjustments in beam direction, focusing, etc., between testing element 10 and SOI structure 20, utilizing received optical power measurements on SOI structure 20 to perform the adjustments. In one arrangement of the embodiment of FIG. 2, an input optical test signal propagates through a section of polarization maintaining fiber 40, which is then coupled into beam steering optics 12 on testing element 10. A similar section of polarization maintaining fiber 42 may be used to out-couple the exiting test response signal. An analysis of the properties of the output signal from polarization maintaining fiber 42 may be used, in accordance with the present invention, to adjust the characteristics of the various mirrors, lenses, etc. within beam steering/shaping optics 12 and/or 14 in order to provide an acceptable degree of coupling of the optical test signal. The inclusion of beam steering/shaping optics allows for the input/output test fibers to be positioned in a preferred direction (i.e., the fibers may be disposed in the same plane as testing element 10 and provide a "horizontal launch" arrangement, or alternatively, the fibers may be disposed perpendicular to the plane of testing element 10 and providing a "vertical launch" arrangement).

As an alternative to polarization maintaining fibers, various other types of fibers (or waveguides in general) may be used. For example, standard single mode fiber, multimode fiber, lensed fibers, etc. may all be used. Individual detectors (on-chip or off-chip), as well as detector arrays, may be used in place of the output fiber. Beam steering elements 12 and 14 may further include elements such as polarization beam splitters and half-wave plates, the half-wave plates used to provide polarization control and rotation. Alternatively, off-element components may be used to provide the desired polarization control. With respect to the light source itself, various arrangements may be used. For example, a tunable laser (or array of tunable lasers) may be used, with the wavelength "tuned" to provide optimized coupling efficiency and/or testing at different system wavelengths. Alternatively, a vertical cavity surface-emitting LED (VCSEL) array may be used. Other arrangements are possible and all are considered to fall within the spirit and scope of the present invention.

Figure 3:
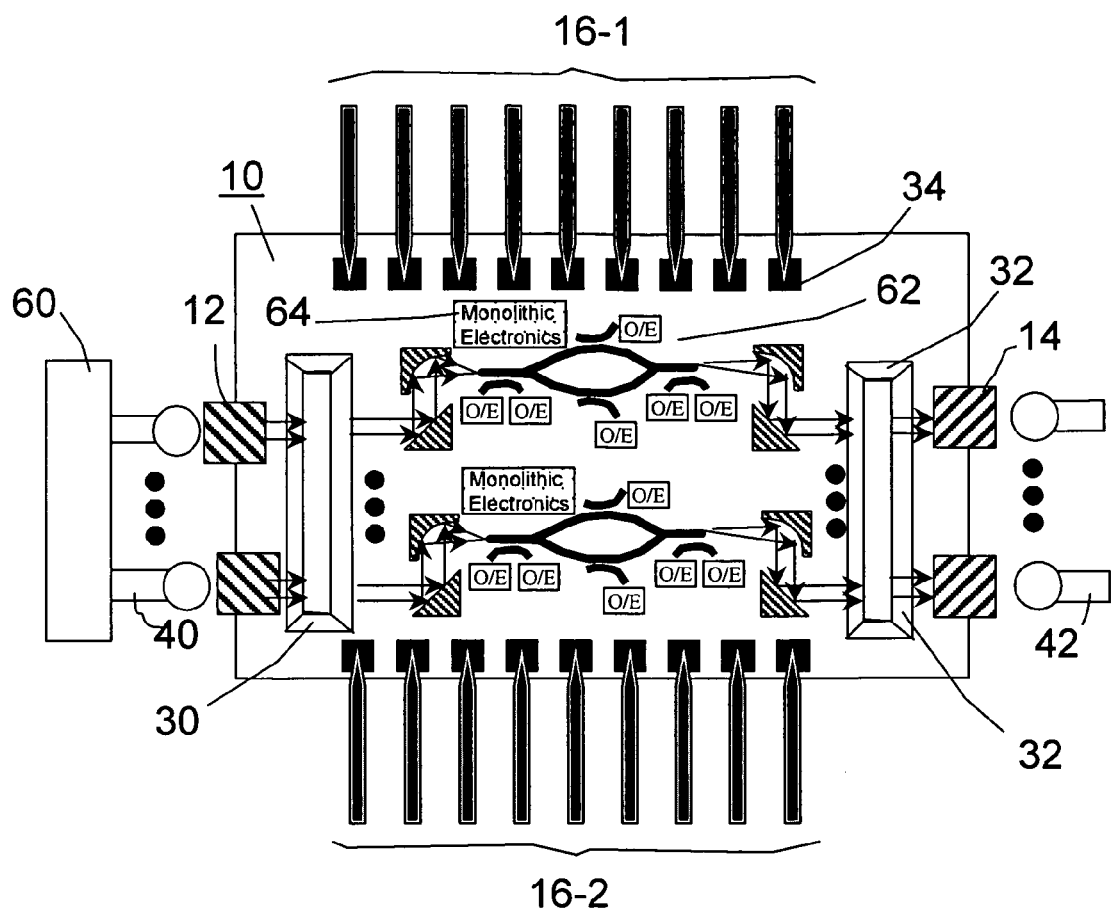
FIG. 3 illustrates, in a side view, an alternative opto-electronic testing element of the present invention, this embodiment utilizing optical gratings formed on the surface of the SOI structure to provide input and output coupling.

FIG. 3 contains a top view of the arrangement of FIG. 2, in this case illustrating the use of an off-element polarization control element 60 at the input of opto-electronic testing element 10 so as to control the polarization state(s) of the applied optical test signal(s). Evident in this view is a first set of electrical test probe points 16-1 disposed along a first side of testing element 10 and a second set of electrical test probe points 16-2 disposed along an opposing side of testing element 10, associated with bondpads 34 of SOI structure 20. An array of separate input test fibers 40 (as well as output fibers 42) is also shown in this view. As is well-known in the semiconductor art, when performing wafer-level testing, the testing element is gently brought into contact with the wafer such that ends of the plurality of test points (test points 16 in this example) just touch the associated bond pads (bond pads 34 in these figures) so as not to disturb the physical properties of the wafer. Various ones of test probe points 16 are utilized to provide electrical input test signals to SOI structure 20, with the remaining test probe points 16 used to couple output electrical test signals. An exemplary arrangement of optical structures and "monolithic electronics" are illustrated in FIG. 3 as contained within SOI structure 20, and thus simultaneously tested by virtue of using opto-electronic testing element 10 as formed in accordance with the present invention.

On-chip optical/electrical (O/E) detectors 62 (preferably integrated in SOI structure 20) or hybrid opto-electronic elements can be used to monitor optical probe signals and generated feedback signals to beam steering/shaping optics 12 and/or optical sources so as to "tune" the test wavelengths, improve coupling, re-position one or more of the beam steering elements, etc. The electrical output signals from selected ones of O/E detectors 62 may also be directed to one or more electrical bondpads 34 and provided as electrical output test signals to selected ones of test probe points 16. It is an aspect of the present invention that by virtue of converting "optical component" test signals into an electrical representation, the need for optical output probes may be eliminated. The ability to combine both optical and electrical test components on a single testing element is considered to greatly facilitate the ability to provide such feedback in real time.

Figure 4:
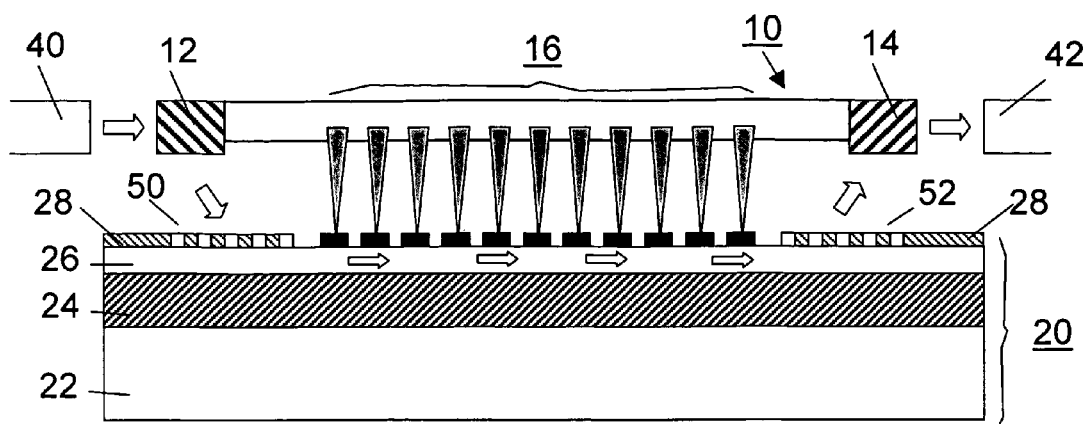
FIG. 4 is a top view of an exemplary opto-electronic testing element of the present invention.

As mentioned above, a set of optical gratings may be used to provide coupling in place of the prism couplers. FIG. 4 illustrates an exemplary embodiment of the present invention where a pair of gratings 50 and 52 is used in place of prism couplers 30, 32 to provide optical coupling. In the embodiment as shown in FIG. 4, input grating 50 is formed within an input coupling region of SOI structure 20. The ability to use such a grating structure to provide efficient coupling into a sub-micron layer such as SOI layer 26 is discussed in detail in applicants' co-pending application Ser. No. 10/935,146, cited above and herein incorporated by reference. Indeed, input grating 50 may be directly formed in SOI layer 26, may be formed within a portion of evanescent coupling layer 28, or within an overlying polysilicon layer in embodiments that exhibit a "poly-loaded" waveguide structure.

In general, the use of coupling/decoupling prisms or gratings in accordance with the present invention allows for opto-electronic testing element 10 to be placed over any appropriate location of an SOI wafer and perform "non-invasive" optical testing (as compared with, for example, the prior art Johannessen reference, which required removal of a portion of a cladding layer and perhaps the waveguide layer to accomplish optical coupling). Moreover, wafer-level testing is easily accomplished in accordance with the present invention without the need to access the "edge" of the wafer (or each separate die) to perform optical testing by virtue of directly coupling an optical test signal into the surface SOI layer of the opto-electronic circuit. In summary, the opto-electronic testing can be performed with the inventive testing element at the wafer level, in a manner similar to the traditional wafer-level electronic integrated circuit testing.

Figure 5:
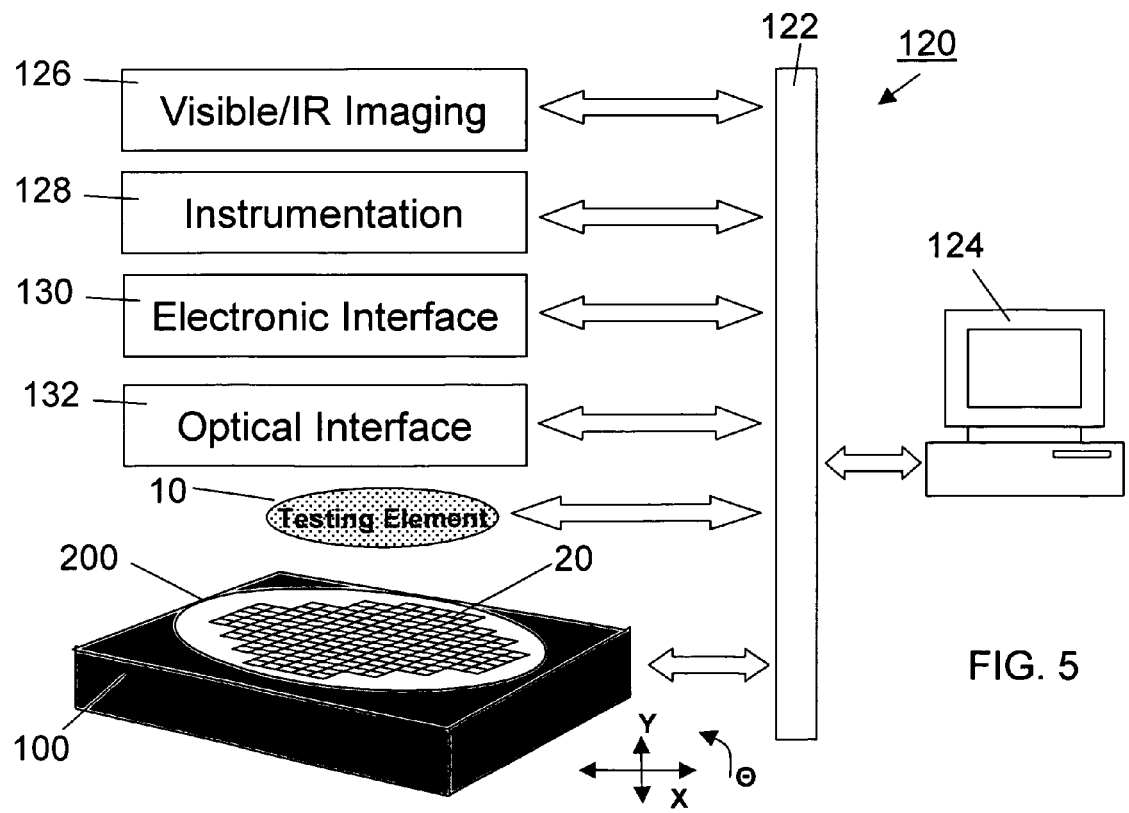
FIG. 5 illustrates an exemplary testing apparatus useful for performing wafer-level testing in accordance with the present invention.

In order to provide a full battery of optical tests, it is necessary that the wafer under test be able to be moved and/or rotated with respect to the testing element, with some of the movement used in this case to test alignment conditions on the SOI wafer itself. FIG. 5 illustrates an exemplary SOI wafer 200 (comprising a plurality of separate SOI structures 20 as discussed above) that is mounted on a multi-axis stage 100, where stage 100 allows for translational x-y movement of wafer 200 with respect to opto-electronic testing element 10, as well as rotational movement (O) between wafer 200 and testing element 10, as indicated by the arrows in FIG. 5. The rotational movement is primarily employed during the initial set-up of the testing arrangement to correct for angular mis-alignment of testing element 10 with respect to SOI wafer 200. The "up"/"down" movement of wafer 200 with respect to testing element 10 is used to allow for the re-alignment of the testing element with various SOI structures 20 during the step-and-repeat process. That is, stage 100 is lowered so as to clear the probes, translated to the next die location and then raised so as to again make contact with testing element 10. The entire testing procedure can be automated by the inclusion of a vision system and known image processing algorithms.

Also illustrated in FIG. 5 is a complete test arrangement 120, including a bus interface 122 for connecting a computer controller 124 to an imaging system 126 and instrumentation 128 used to perform/control the various desired optical and electrical tests on SOI structures within SOI wafer 200. Also coupled to bus 122 is an electronic interface 130 and an optical interface 132, for providing the electrical and optical input test signals to, as well as response signals from, testing element 10.

As shown, various input control signals (including the position of testing element 10, beam steering elements and optical test wavelength(s)) and input test signals (both optical and electrical) pass along bus 122 and are applied to either opto-electronic testing element 10 or multi-axis stage 100. The returning test signals (both optical and electrical) are also transmitted along bus 122 and stored in appropriate diagnostic/test memory units within computer controller 124. Based on the actual test results and associated "acceptable" values stored in computer controller 124, each SOI structure can be evaluated using specific test algorithms, with structures that fail certain tests being marked as "unacceptable". For example, the surface of an unacceptable component may be marked with a visual indicator, such as a magnetic ink, on the circuit itself such that when the wafer is diced into individual components the "failed" circuits can be discarded.

The nature of the individual tests, inputs signals, desired response signal values, etc. are not considered to be germane to the subject matter of the present invention, which is instead directed to the formation and use of a single opto-electronic testing element to perform essentially all wafer-level testing of an opto-electronic wafer. Further, the specific embodiments of the present invention as described above are considered to be illustrative only. Numerous modifications in the form and detail may be made by those skilled in the art without departing from the scope of the invention as defined by claims provided hereinbelow.

What is claimed is:

1. A wafer-level testing arrangement for use with an integrated opto-electronic silicon-on-insulator (SOI)-based structure formed on a silicon wafer, the arrangement comprising
    an opto-electronic testing element for removably contacting a top major surface of the silicon water, the opto-electronic testing element including
        at least one optical input fiber for directing at least one optical test signal toward the SOI-based structure; and
        a plurality of electrical test pins, disposed in a pattern matching a plurality of bond pads on the surface of the opto-electronic SOI-based structure being tested, the plurality of electrical test pins for energizing the opto-electronic SOI-based structure being tested and providing electrical test signals to and electrical response signals from the opto-electronic SOI-based structure being tested; and
    optical coupling features disposed between the opto-electronic testing element and the surface of a specific opto-electronic SOI-based structure being tested for coupling optical test signals into the specific opto-electronic SOI-based structure being tested, wherein the at least one optical input fiber is disposed through the opto-electronic testing element at a predetermined angle so as to provide for a desired degree of optical coupling into the optical coupling features.

2. The wafer-level testing arrangement as defined in claim 1 wherein the at least one optical input fiber comprises an array of optical fibers, each fiber capable of supplying a different optical test signal.

3. The wafer-level testing arrangement as defined in claim 1 wherein the at least one optical input fiber comprises at least one lensed optical fiber.

4. The wafer-level testing arrangement as defined in claim 1 wherein the arrangement further comprises
    a tuning element for adjusting the wavelength of at least one input optical test signal.

5. The wafer-level testing arrangement as defined in claim 1 wherein the opto-electronic testing element further comprises
    beam steering/shaping optics for providing optical direction/focusing between the at least one optical input fiber and the top major surface of the opto-electronic structure being tested.

6. The wafer-level testing arrangement as defined in claim 5 wherein the opto-electronic testing element bean steering/shaping optics includes electrically-controllable movable mirrors.

7. The wafer-level testing arrangement as defined in claim 5 wherein the opto-electronic testing element beam steering/shaping optics includes a polarization controlling element and half-wave plate to provide polarization control to an input optical test signal.

8. The wafer-level testing arrangement as defined in claim 5 wherein the arrangement further comprises
    a feedback component disposed between the SOI structure and the beam steering/shaping optics to adjust the positioning of the at least one optical input fiber with respect to the surface of the silicon wafer.

9. The wafer-level testing arrangement as defined in claim 1 wherein the arrangement further comprises
    a feedback component disposed between the SOI structure and the at least one optical input fiber to adjust the wavelength of the optical test signals to provide improved coupling efficiency.

10. The wafer-level testing arrangement as defined in claim 1 wherein the at least one optical input fiber comprises a waveguiding structure selected from the group consisting of: polarization maintaining fiber, single mode optical fiber, lensed polarization maintaining single mode fiber and lensed single mode fiber.

11. The wafer-level testing arrangement as defined in claim 1 wherein the optical coupling features include an evanescent coupling layer disposed over selected areas of the top major surface of the SOI structure, the evanescent coupling layer exhibiting an index of refraction less than that of silicon.

12. The wafer-level testing arrangement as defined in claim 1 wherein the optical coupling features comprise at least one optical coupling prism disposed at a predetermined input optical coupling location so as to provide evanescent coupling into the SOI structure.

13. The wafer-level testing arrangement as defined in claim 1 wherein the optical coupling features comprise at least one optical grating formed in the SOI structure at a predetermined input optical coupling location.

14. The wafer-level testing arrangement as defined in claim 1 wherein the opto-electronic testing element further comprises at least one optical output signal path for receiving at least one optical test response signal.

15. The wafer-level testing arrangement as defined in claim 14 wherein the optical coupling features further comprise at least one optical coupling prism disposed at a predetermined output optical coupling location.

16. The wafer-level testing arrangement as defined in claim 14 wherein the optical coupling features further comprising at least one optical grating formed in the SOI structure at a predetermined output optical coupling location.

17. The wafer-level testing arrangement as defined in claim 14 wherein the at least one optical output signal path is selected from the group consisting of: polarization maintaining fiber, single mode optical fiber, lensed polarization maintaining single mode fiber, lensed signal mode fiber, multimode fiber and leased multimode fiber.

* * * * *